US008885654B2

(12) United States Patent
Kondapalli et al.

(10) Patent No.: US 8,885,654 B2
(45) Date of Patent: *Nov. 11, 2014

(54) METHOD AND APPARATUS FOR FLEXIBLE INTERFACE BYPASS OPTIONS IN SWITCHES

(71) Applicant: Marvell World Trade Ltd., St. Michael (BB)

(72) Inventors: Raghu Kondapalli, San Jose, CA (US); John M. Bergen, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 140 days.

This patent is subject to a terminal disclaimer.

(21) Appl. No.: 13/730,478

(22) Filed: Dec. 28, 2012

(65) Prior Publication Data
US 2013/0163604 A1 Jun. 27, 2013

Related U.S. Application Data

(63) Continuation of application No. 12/025,387, filed on Feb. 4, 2008, now Pat. No. 8,345,702.

(60) Provisional application No. 60/867,250, filed on Feb. 7, 2007.

(51) Int. Cl.
| | | |
|---|---|---|
| *H04L 12/28* | (2006.01) | |
| *H04L 12/26* | (2006.01) | |
| *H04L 12/56* | (2006.01) | |
| *H04L 12/931* | (2013.01) | |
| *H04L 12/935* | (2013.01) | |
| *H04L 12/947* | (2013.01) | |

(52) U.S. Cl.
CPC ........... *H04L 49/351* (2013.01); *H04L 49/3009* (2013.01); *H04L 49/25* (2013.01); *H04L 49/602* (2013.01)
USPC ........... 370/401; 370/419; 370/217; 370/392; 370/423

(58) Field of Classification Search
None
See application file for complete search history.

(56) References Cited

U.S. PATENT DOCUMENTS

| | | | |
|---|---|---|---|
| 5,179,670 | A | 1/1993 | Farmwald et al. |
| 5,349,683 | A | 9/1994 | Wu et al. |

(Continued)

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.

(Continued)

*Primary Examiner* — Faruk Hamza
*Assistant Examiner* — Cassandra Decker

(57) ABSTRACT

A network apparatus including a central processing unit, first physical layer devices, a second physical layer device, and a network switch. The network switch includes first ports communicating with the first physical layer devices; a second port communicating with the second physical layer device; and third and fourth ports communicating with the central processing unit over first and second media independent interfaces, respectively. The network switch includes a switch core module configured to route data packets between connected ports, including the first and third ports. The network switch includes a bypass switch configured to (i) in response to a first mode being selected, directly connect the second port and the fourth port, bypassing the switch core module, and (ii) in response to a second mode being selected, disconnect the second port from the fourth port and connect the second and fourth ports to the switch core module.

20 Claims, 7 Drawing Sheets

(56) References Cited

U.S. PATENT DOCUMENTS

| | | | |
|---|---|---|---|
| 5,841,990 | A | 11/1998 | Picazo, Jr. et al. |
| 6,212,165 | B1 | 4/2001 | Mann et al. |
| 6,359,893 | B1 | 3/2002 | Mills |
| 7,675,849 | B2 | 3/2010 | Watson et al. |
| 7,899,929 | B1 | 3/2011 | Beser |
| 2003/0097467 | A1 | 5/2003 | Sano |
| 2004/0085910 | A1 | 5/2004 | Wang |
| 2004/0196859 | A1 | 10/2004 | Benner |
| 2006/0165099 | A1 | 7/2006 | Doherty et al. |
| 2006/0271720 | A1 | 11/2006 | James et al. |

OTHER PUBLICATIONS

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE 802.11n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE Std 802.11h™-2003 [Amendment to IEEE Std 802.11™, 1999 Edition (Reaff 2003) as amended by IEEE Stds 802.11a™-1999, 802.11b™-1999, 802.11b™-1999/Cor 1-2001, 802.11d™-2001, 802.11g™-2003]; IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe; IEEE Computer Society; LAN/MAN Standards Committee; Oct. 14, 2003; 75 pages.

IEEE 802.20-PD-06; IEEE P 802.20™ V14; Jul. 16, 2004; Draft 802.20 Permanent Document; System Requirements for IEEE 802.20 Mobile Broadband Wireless Access Systems—Version 14; 24 pages.

IEEE Std 802.16-2001™; IEEE Standard for Local and metropolitan area networks; Part 16: Air Interface for Fixed Boradband Wireless Access Systems; IEEE Computer Society and the IEEE Microwave Theory and Techniques Society; Sponsored by the LAN/MAN Standards Committee; Apr. 8, 2002; 349 pages.

IEEE Std 802.11g/D2.8, May 2002 (Supplement to ANSI/IEEE Std 802.11, 1999 Edition); Draft Supplement to Standard [for] Information Technology—Telecommunications and information exchange between systems—Local and metropolitan area networks—Specific requirements—Part 11: Wireless LAN Medium Access Contorl (MAC) and Physical Layer (PHY) specifications: Further Higher-Speed Physical Layer Extension in the 2.4 GHz Band; Sponsor LAN/MAN Standards Committee of the IEEE Computer Society; 47 pages.

Notification of Transmittal of the International Search Report and the Written Opinion of the International Searching Authority, or the Declaration dated Aug. 4, 2008 in reference to PCT /US2008/001617.

METHOD AND APPARATUS FOR FLEXIBLE INTERFACE BYPASS OPTIONS IN SWITCHES

CROSS-REFERENCE TO RELATED APPLICATIONS

This is a continuation of U.S. patent application Ser. No. 12/025,387 (now U.S. Pat. No. 8,345,702), filed on Feb. 4, 2008, which claims the benefit of U.S. Provisional Application No. 60/867,250, filed on Feb. 7, 2007. The entire disclosures of the above applications are incorporated herein by reference.

FIELD

The present disclosure relates to network switches.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a network router 10 is shown in accordance with the prior art. Router 10 includes a switch 12. Switch 12 includes a plurality of communication port modules 14-0 ... 14-6, which are collectively referred to as port modules 14. Although seven port modules 14 are shown, it should be appreciated that more or fewer port modules 14 may be used. Ports 14-0 through 14-4 communicate with associated physical layer devices 16-0 through 16-4. Physical layer devices 16-0 ... 16-3 are depicted as AC-coupled links such as 10/100-BASET, however it should be appreciated that other types of physical layers may also be employed. Physical layer devices 16-0 ... 16-3 include respective connectors 18-0 ... 18-3 that couple with respective network channels, such as copper cables and or/antennas. Physical layer device 16-4 is depicted as a 100/1000 Mbit laser, however it should be appreciated that another type of physical layer may also be employed. Physical layer device 16-4 includes a respective connector 18-4 that couples with a respective network channel, such as fiber-optic cables.

Switch 12 includes a switch core module 20. Switch core module 20 routes data packets between port modules 14 based on link layer information that is included in the packets. Switch core module 20 includes an ingress processing module 22, a queuing module 24, and an egress processing module 26. Ingress processing module 22 performs switching functionality on incoming packets. Queuing module 24 stores packets. Egress module 26 performs packet modification and transmits each packet to an appropriate destination port 14. A clock (CLK) 27 establishes a frequency that egress module 26 transmits the data in each packet.

A central processing unit (CPU) 30 communicates with switch 12. CPU 30 can include firmware which implements first and second media access control (MAC) modules 32-1 and 32-2, collectively 32. CPU 30 may also communicate with a network layer via an input/output data bus 40. CPU 30 includes a media data clock (MDC) and a media data input/output pin (MDIO) that provide synchronous communication with switch 12. CPU 30 also includes a communication interface for each MAC 32. The communication interfaces carry the packets between each MAC 32 and its associated one of port modules 14. Examples of communication interfaces include media independent interface (MII) reduced MII (RMII), gigabit MII (GMII), reduced gigabit MII (RGMII), 10 gigabit MII (XGMII), and serial gigabit MII (SGMII), Ethernet, fiber optic, wide area network (WAN), and the like.

A light emitting diode (LED) array 46 indicates a status and/or speed of associated port modules 14. The LED array 46 can be controlled by switch 12. An oscillator 48 drives a clock of switch 12.

During operation of router 10, data packets enter port modules 14 and pass to switch core module 20. Switch core module 20 passes the data packet to CPU 30. CPU 30 inspects network address information contained in the packets to determine which one of port modules 14 each packet should be routed to. CPU 30 then inserts routing data in each packet. The routing data corresponds with the one of port modules 14 that the packet will be routed to. CPU 30 then passes the packets back to switch core module 20. Switch core module 20 stores and forwards the packet in accordance with the inserted routing data.

SUMMARY

A network switching module includes N communication port modules that send and receive data packets that include physical layer addresses. A switch core module routes the data packets between N−2 of the communication port modules based on the physical layer addresses. A bypass module selectively routes the data packets between two of the communication port modules such that the data packets bypass the switch core module. N is an integer greater than or equal to 4.

In other features the data packets include internet protocol addresses. The network switching module includes an address update module that updates the physical layer addresses based on the internet protocol addresses. A multiplexer selectively provides communication between the N−2 port modules and the switch core module. A bypass switch selectively bypasses the data packets around the multiplexer. A mode switch selects one of the N−2 port modules from a group of M port modules. M is an integer greater than or equal to 2. The M port modules implement different communication interfaces. The communication interfaces include at least two of a media independent interface (MII) a reduced MII (RMII), a gigabit MII (GMII), a reduced gigabit MII (RGMII), a 10 gigabit MII (XGMII), and a serial gigabit MII (SGMII). A mode register indicates at least one of a selected port of the M port modules and a selected one of the communication interfaces that is implemented by the selected port.

A network switching method sends and receives data packets via N communication port modules, routes data packets between N−2 of the communication port modules based on physical layer addresses included in the data packets, and routes the data packets directly between two of the communication port modules irrespective of their associated physical layer addresses. N is an integer greater than or equal to 4.

In other features the data packets include internet protocol addresses and the method updates the physical layer addresses based on the internet protocol addresses. The method selectively provides communication between the N−2 port modules and a switch core module. The method selectively bypasses the data packets around the switch core module. The method selects one of the N−2 port modules from a group of M port modules. M is an integer greater than or equal to 2. The M port modules implement different communication interfaces. The communication interfaces include at least two of a media independent interface (MII) a reduced MII (RMII), a gigabit MII (GMII), a reduced gigabit MII (RGMII), a 10 gigabit MII (XGMII), and a serial gigabit MII (SGMII). The method indicates at least one of a selected port of the M port modules and a selected one of the communication interfaces that is implemented by the selected port.

A network switching module includes N communication port means for sending and receiving data packets that include physical layer addresses. Switch core means route the data packets between N−2 of the communication port means based on the physical layer addresses. Bypass means selectively route the data packets between two of the communication port means such that the data packets bypass the switch core means. N is an integer greater than or equal to 4.

In other features the data packets include internet protocol addresses. The network switching module includes address update means for updating the physical layer addresses based on the internet protocol addresses. Multiplexing means selectively provide communication between the N−2 port means and the switch core means. Bypass switch means selectively bypass the data packets around the multiplexing means. Mode switch means select one of the N−2 port means from a group of M port means. M is an integer greater than or equal to 2. The M port means implement different communication interfaces. The communication interfaces include at least two of a media independent interface (MII) a reduced MII (RMII), a gigabit MII (GMII), a reduced gigabit MII (RGMII), a 10 gigabit MII (XGMII), and a serial gigabit MII (SGMII). Mode register means indicate at least one of a selected port of the M port modules and a selected one of the communication interfaces that is implemented by the selected port.

A computer program performs network switching and is executed by one or more processors. The computer program resides on a computer readable medium such as but not limited to memory, non-volatile data storage and/or other suitable tangible storage mediums. The computer program sends and receives data packets via N communication port modules, routes data packets between N−2 of the communication port modules based on physical layer addresses included in the data packets, and routes the data packets directly between two of the communication port modules irrespective of their associated physical layer addresses. N is an integer greater than or equal to 4.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
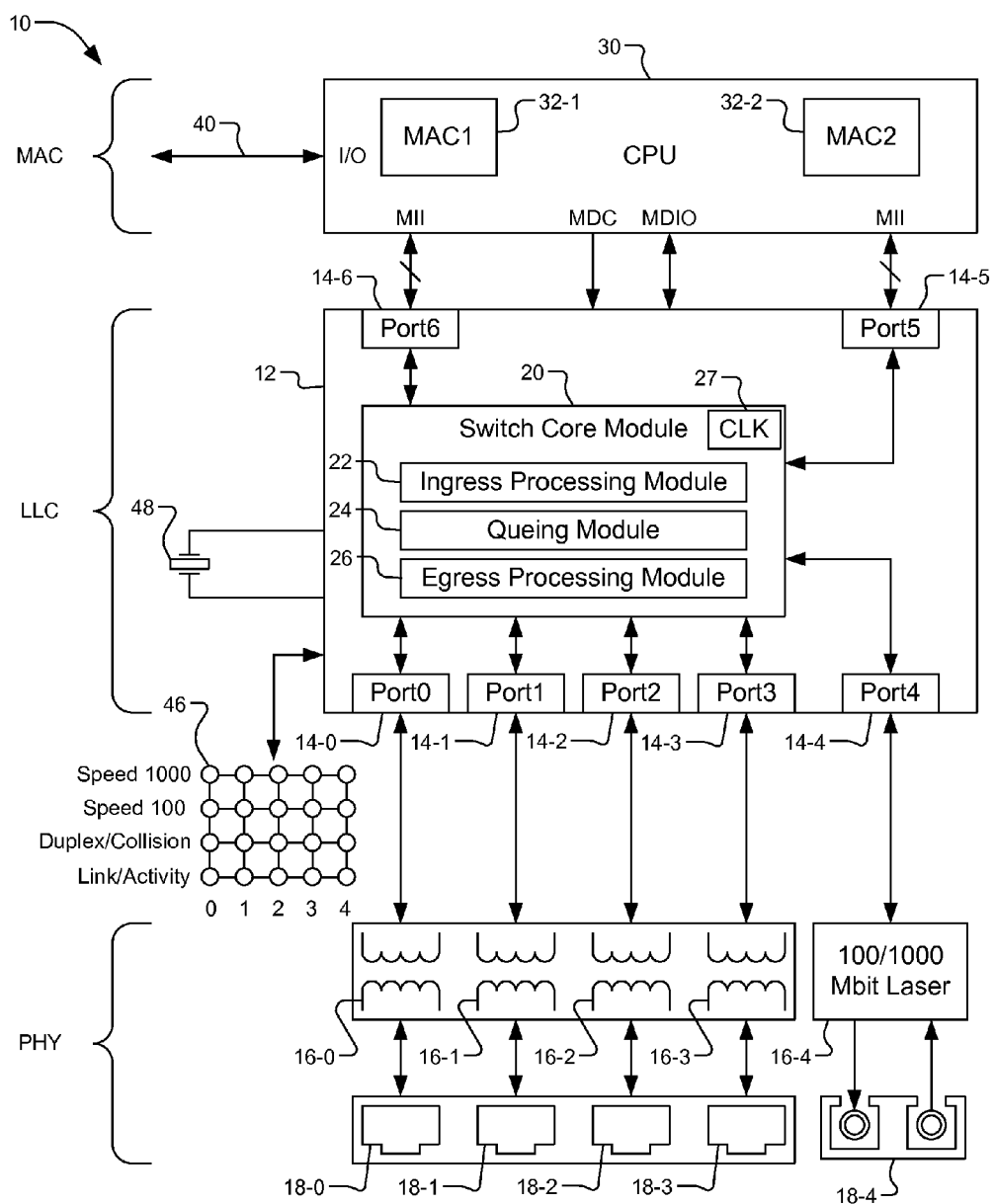
FIG. 1 is a functional block diagram of a network router in accordance with the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 2:
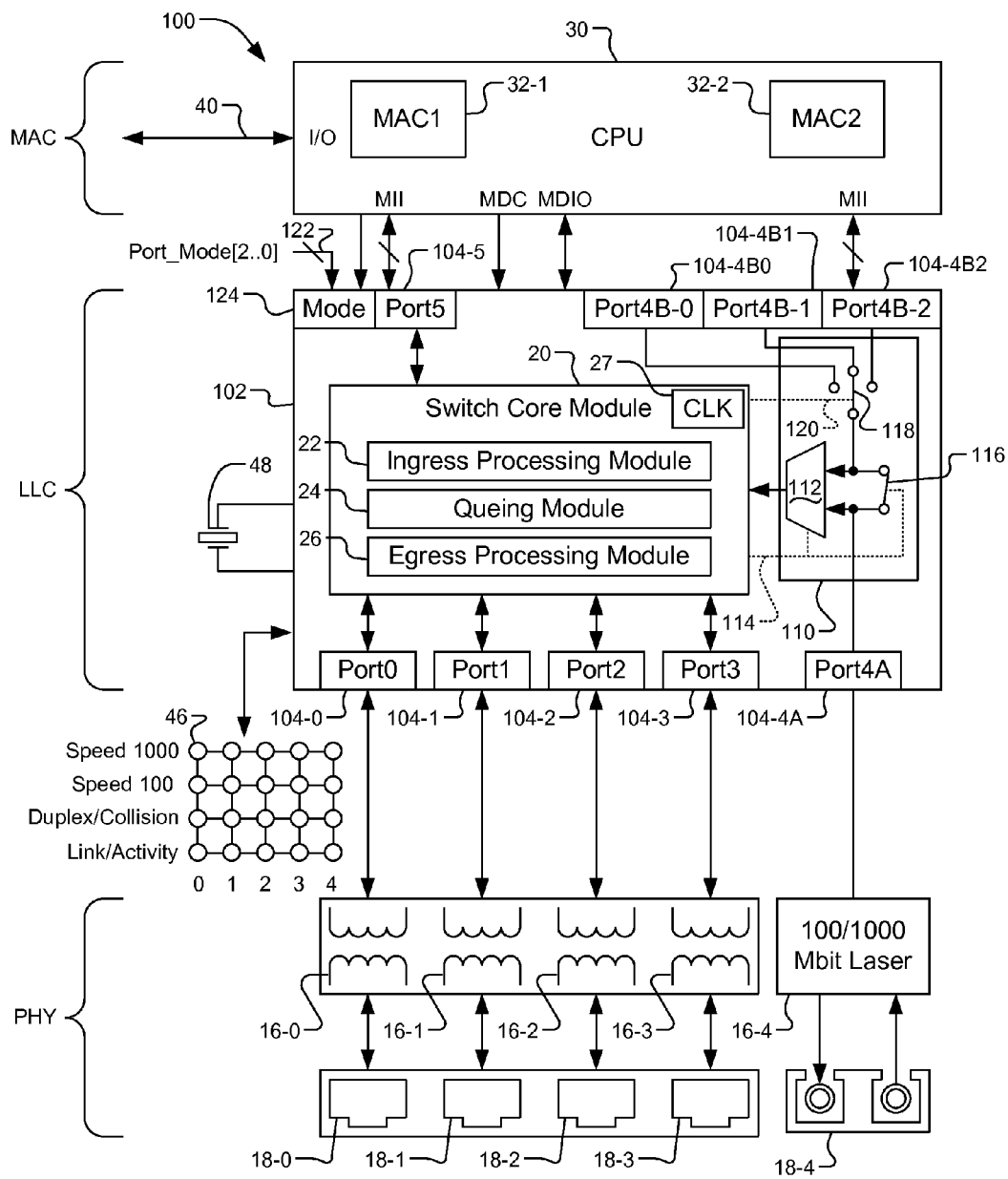
FIG. 2 is a functional block diagram of a first network router that includes a bypass switch.

Referring now to FIG. 2, a functional block diagram is shown of a network router 100. Some elements of network router 100 are the same or similar to elements of router 10 of the prior art. The same or similar elements share the same reference designator as those elements in FIG. 1.

Router 100 includes a novel network switch 102. Network switch 102 includes a plurality of port modules 104-0, 104-1, 104-2, 104-3, 104-4A, 104-4B0, 104-4B1, 104-4B2, and 104-5, collectively referred to as port modules 104. Although FIG. 2 shows a number of port modules, it should be appreciated that as few as four port modules and as many as N port modules may be used, where N is an integer greater than or equal to 4. One or more of port modules 104 can be configured to implement or employ one of M communication interfaces, where M is an integer greater than or equal to 2. Examples of communication interfaces include media independent interface (MII) reduced MII (RMII), gigabit MII (GMII), reduced gigabit MII (RGMII), 10 gigabit MII (XGMII), serial gigabit MII (SGMII), Ethernet, fiber optic, wide area network (WAN), and the like. For wireless network applications and interfaces, please refer to IEEE standards 802.11, 802.11a, 802.11b, 802.11g, 802.11h, 802.11n, 802.16, and 802.20, which are hereby incorporated by reference in their entirety.

When two port modules 104 are configured to use the same or similar types of communication interfaces, it may be inefficient for switch core module 20 to be involved in routing packets between those two port modules 104. Same or similar types of communication interfaces are interfaces with associated packets that share a common header format with regard to link layer information. For example, if port module 104-4A implements a 1000BASE-X communication interface and port module 104-4B2 implements a GMII interface, then those two port modules share a common header format.

Depending on an anticipated routing of packets that are received at those two port modules, switch core module 20 may not need to be involved in routing those packets. For example, if it is known that all of the packets that are received at port module 104-4A will be routed to port module 104-4B2 and vice-versa, then switch core module 20 does not need to be involved in routing those packets. Bypassing those packets around switch core module 20 can improve an overall bandwidth of router 100 and reduce a processing burden on switch core module 20.

Network switch 102 includes a bypass module 110. Bypass module 110 selectively bypasses packets between two of port modules 104 and around switch core module 20. Bypass module 110 includes a multiplexer (MUX) 112, bypass control input 114, and a bypass switch 116. In some embodiments bypass module 110 includes a mode switch 118 and an interface control input 120. Inputs of MUX 112 communicate with respective ones of port modules 104. In the depicted embodiment, a first input of MUX 112 communicates with port module 104-4A and second input of MUX 112 communicates with port module 104-4B1 via mode switch 118. An output of MUX 112 communicates with switch core module 20. Packets that enter MUX 112 are communicated to switch core module 20.

Bypass control input 114 determines whether bypass switch 116 is open or closed and whether MUX 112 is active. When bypass control input 114 is in a first logic state then bypass switch 116 is open and MUX 112 is active. When bypass control input 114 is in a second logic state then bypass switch 116 is closed and MUX 112 is inactive.

When bypass control input 114 is in the first logic state then port module 104-4A and the one of port modules 104-B0 . . . 104-B2 that routes though mode switch 118 communicate with switch core module 20 through MUX 112. When mode switch 118 is not implemented and bypass control input 114 is in the first logic state, then port module 104-4A and one of port modules 104-B0 . . . 104-B2 communicate with switch core module 20 through MUX 112.

When bypass control input 114 is in the second logic state then port module 104-4A communicates through bypass switch 116 with the one of port modules 104-4B0 . . . 104-4B2 that routes though mode switch 118. When mode switch 118 is not implemented and bypass control input 114 is in the second logic state, then port module 104-4A communicates with one of port modules 104-4B0 . . . 104-4B2.

Mode switch 118 includes a plurality of nodes that communicate with associated ones of port modules 104-4B0 . . . 104-4B2 based on a setting of interface control input 120. Each of port modules 104-4B0 . . . 104-4B2 implements a different one of the communication interfaces. When network switch 102 first powers up and/or comes out of reset, settings or states of bypass control input 114 and interface control input 120 can be determined based on voltages that are applied to mode inputs 122. Each of mode inputs 122 can individually be tied to a supply voltage or ground.

Network switch 102 will then manipulate bypass control input 114 and/or interface control input 120 such that mode switch 118 selects the desired communication interface. In some embodiments network switch 102 includes a mode control register 124. CPU 30 reads and writes mode control register 124 to determine and set the state of interface control input 120.

Bypass module 110 effectively increases a communication bandwidth of network switch 102 over the prior art. Bypass module 110 improves the bandwidth by bypassing some packets around switch core module 20. The bypassing packets include link layer information that does not need to be changed by switch core module 20. Those packets instead bypass switch core module 20 and are routed directly to a respective media access controller 32.

Figure 3:
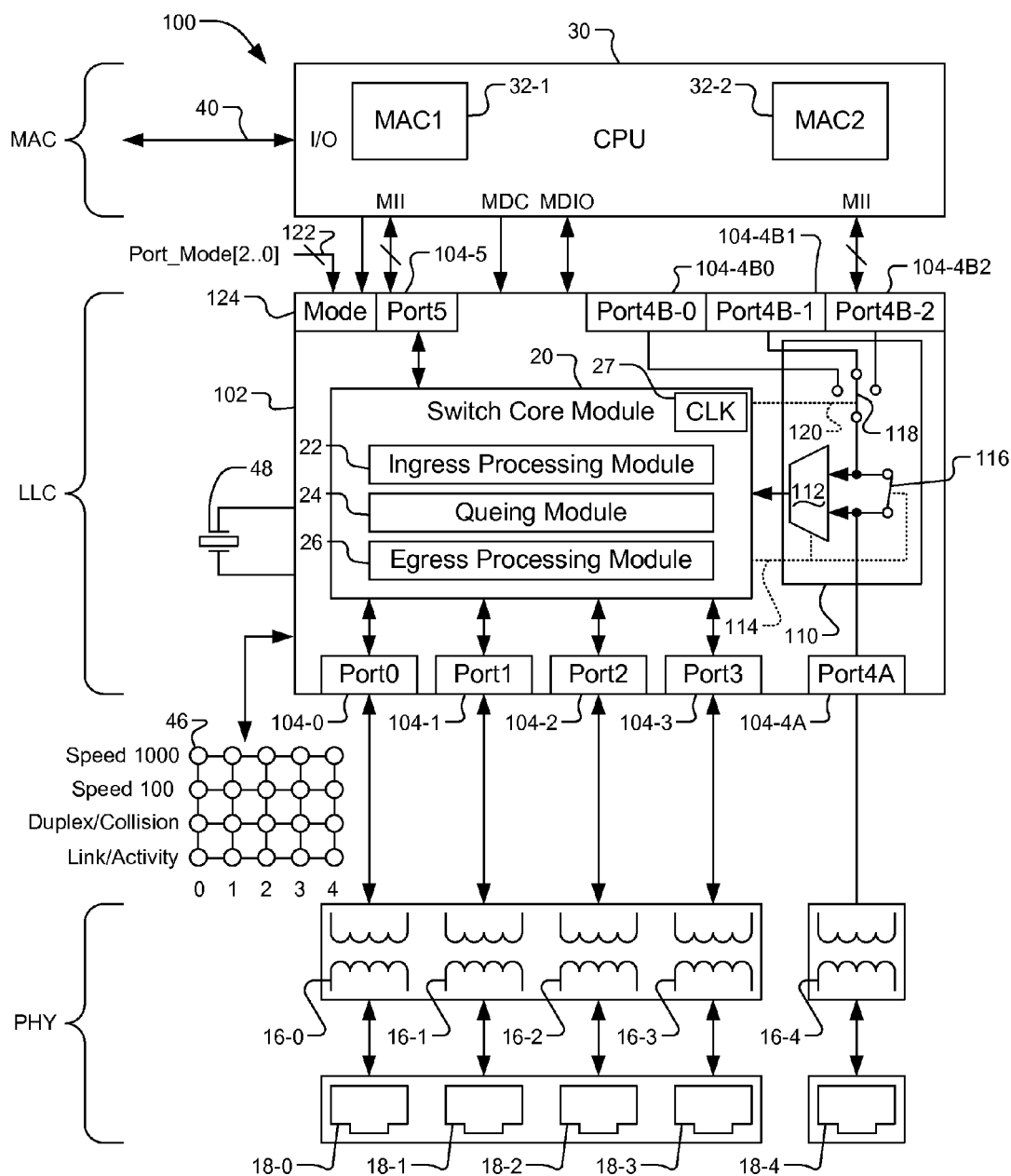
FIG. 3 is a functional block diagram of a second network router that includes a bypass switch.

Referring now to FIG. 3, a functional block diagram is shown of a router 100 that is configured with port module 104-4A connected to a 1000Base-T physical layer device 16-4 and connector 18-4. Router 100 is otherwise identical to router 100 shown in FIG. 2.

Figure 4:
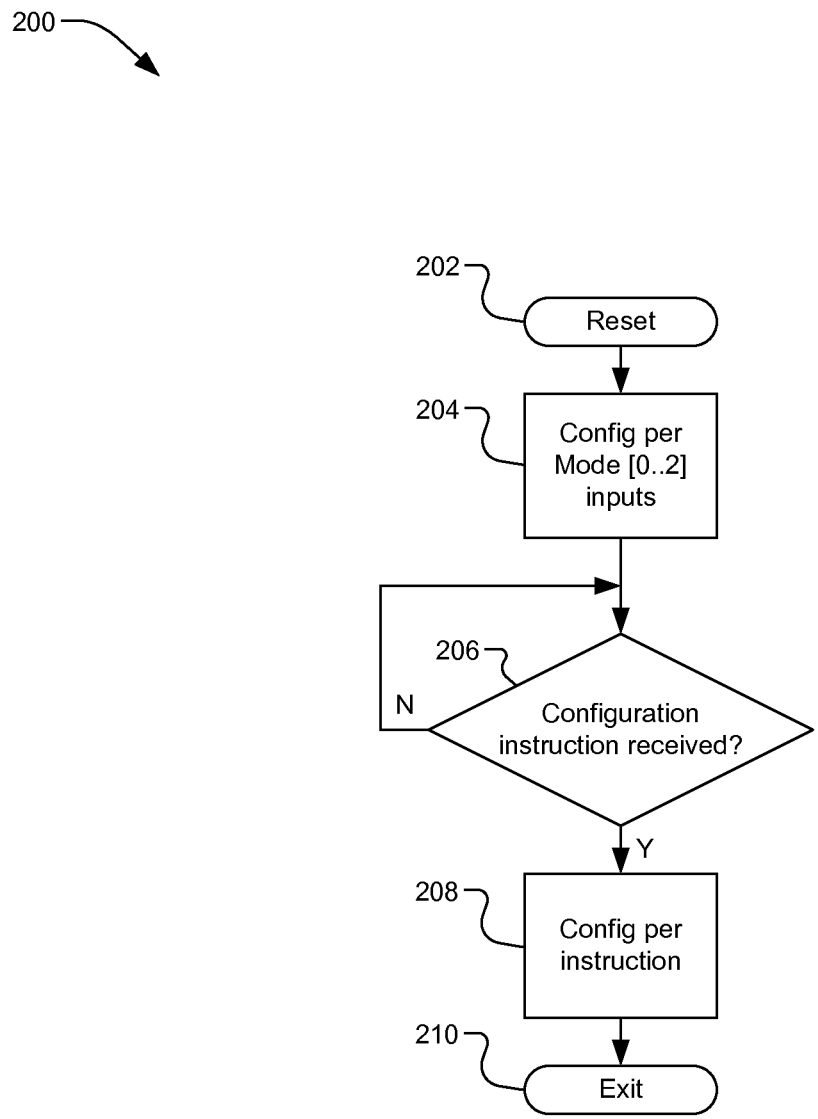
FIG. 4 is a flowchart of a method that configures the bypass switch of FIGS. 2-3.

Referring now to FIG. 4, a flow chart is shown of a method 200. Method 200 may be employed to manipulate control input 114 and/or interface control input 120 into desired states. Method 200 can be executed by network switch 102 when it comes out of reset.

Control enters at block 202 and immediately proceeds to block 204. In block 204, control reads the states of mode inputs 122 and configures CLK 27, MUX 112, bypass switch 116, and/or mode switch 118 based on the states. Table 1 below shows examples of states of mode inputs 122 and corresponding settings for CLK 27, MUX 112, bypass switch 116, and/or mode switch 118. Control then branches to decision block 206 and monitors mode control register 124 to determine if a configuration instruction has been sent from CPU 30. If not, then control continues to monitor mode control register 124. When CPU 30 writes to mode control register 124 then control branches to block 208. In block 208 control reconfigures CLK 27, MUX 112, bypass switch 116, and/or mode switch 118 in accordance with the configuration instruction that was written to mode control register 124. The configurations instructions correspond with the states of mode inputs 122 as shown in Table 1. After block 208 control may exit via block 210. In some embodiments control may branch from block 208 back to decision block 206 and await a new configuration instruction.

TABLE 1

| Mode Input | Switch 116 | CLK 27 | MUX 112/ Switch 118 |
|---|---|---|---|
| 0x0 | Open | Freq 1 | Enabled/Port4B-0 |
| 0x1 | Open | Freq 2 | Enabled/Port4B-1 |
| 0x2 | Open | Freq 1 | Enabled/Port4B-2 |
| 0x3 | Open | Freq 2 | Enabled/Port4B-2 |
| 0x4 | Open | Freq 3 | Enabled/Port4B-2 |
| 0x5 | Closed | X | Disabled/Port4B-0 |
| 0x6 | Closed | X | Disabled/Port4B-0 |
| 0x7 | Closed | X | Disabled/Port4B-0 |

Figure 5A:
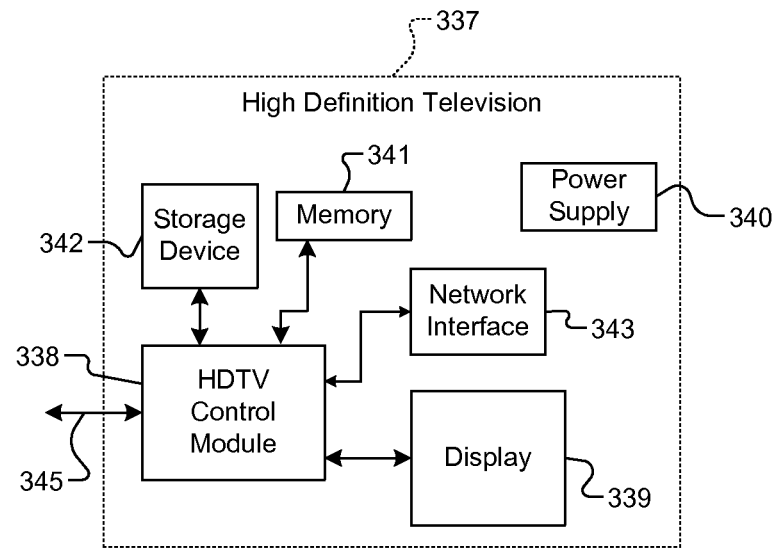
FIG. 5A is a functional block diagram of a high definition television.

Referring now to FIG. 5A, the teachings of the disclosure can be implemented in a network interface 343 of a high definition television (HDTV) 337. The HDTV 337 includes an HDTV control module 338, a display 339, a power supply 340, memory 341, a storage device 342, the network interface 343, and an external interface 345. If the network interface 343 includes a wireless local area network interface, an antenna (not shown) may be included.

The HDTV 337 can receive input signals from the network interface 343 and/or the external interface 345, which can send and receive data via cable, broadband Internet, and/or satellite. The HDTV control module 338 may process the input signals, including encoding, decoding, filtering, and/or formatting, and generate output signals. The output signals may be communicated to one or more of the display 339, memory 341, the storage device 342, the network interface 343, and the external interface 345.

Memory 341 may include random access memory (RAM) and/or nonvolatile memory such as flash memory, phase change memory, or multi-state memory, in which each memory cell has more than two states. The storage device 342 may include an optical storage drive, such as a DVD drive, and/or a hard disk drive (HDD). The HDTV control module 338 communicates externally via the network interface 343 and/or the external interface 345. The power supply 340 provides power to the components of the HDTV 337.

Figure 5B:
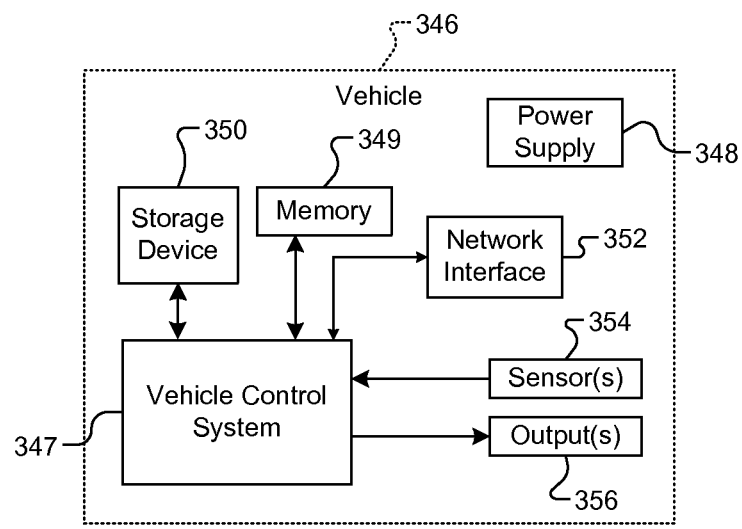
FIG. 5B is a functional block diagram of a vehicle control system.

Referring now to FIG. 5B, the teachings of the disclosure may be implemented in a network interface 352 of a vehicle 346. The vehicle 346 may include a vehicle control system 347, a power supply 348, memory 349, a storage device 350, and the network interface 352. If the network interface 352 includes a wireless local area network interface, an antenna (not shown) may be included. The vehicle control system 347 may be a powertrain control system, a body control system, an entertainment control system, an anti-lock braking system (ABS), a navigation system, a telematics system, a lane departure system, an adaptive cruise control system, etc.

The vehicle control system 347 may communicate with one or more sensors 354 and generate one or more output signals 356. The sensors 354 may include temperature sensors, acceleration sensors, pressure sensors, rotational sensors, airflow sensors, etc. The output signals 356 may control engine operating parameters, transmission operating parameters, suspension parameters, etc.

The power supply 348 provides power to the components of the vehicle 346. The vehicle control system 347 may store data in memory 349 and/or the storage device 350. Memory 349 may include random access memory (RAM) and/or nonvolatile memory such as flash memory, phase change memory, or multi-state memory, in which each memory cell has more than two states. The storage device 350 may include an optical storage drive, such as a DVD drive, and/or a hard disk drive (HDD). The vehicle control system 347 may communicate externally using the network interface 352.

Figure 5C:
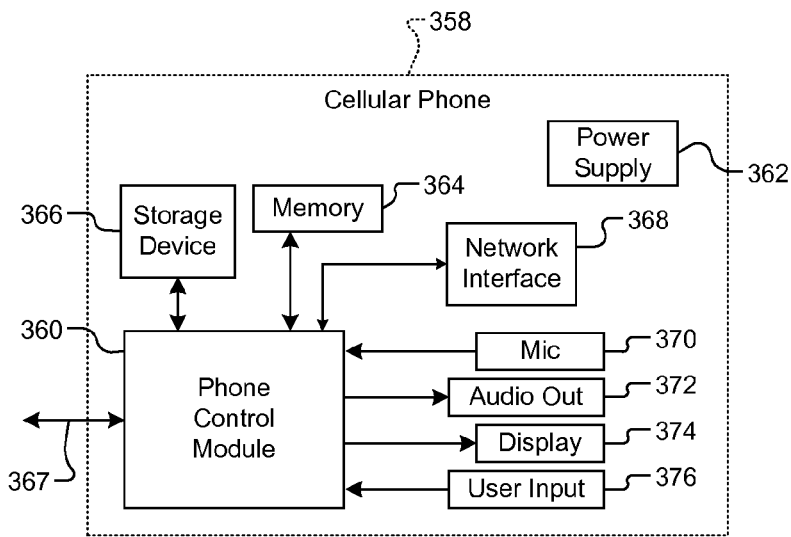
FIG. 5C is a functional block diagram of a cellular phone.

Referring now to FIG. 5C, the teachings of the disclosure can be implemented in a network interface 368 of a cellular phone 358. The cellular phone 358 includes a phone control module 360, a power supply 362, memory 364, a storage device 366, and a cellular network interface 367. The cellular phone 358 may include the network interface 368, a microphone 370, an audio output 372 such as a speaker and/or output jack, a display 374, and a user input device 376 such as a keypad and/or pointing device. If the network interface 368 includes a wireless local area network interface, an antenna (not shown) may be included.

The phone control module 360 may receive input signals from the cellular network interface 367, the network interface 368, the microphone 370, and/or the user input device 376. The phone control module 360 may process signals, including encoding, decoding, filtering, and/or formatting, and generate output signals. The output signals may be communicated to one or more of memory 364, the storage device 366, the cellular network interface 367, the network interface 368, and the audio output 372.

Memory 364 may include random access memory (RAM) and/or nonvolatile memory such as flash memory, phase change memory, or multi-state memory, in which each memory cell has more than two states. The storage device 366 may include an optical storage drive, such as a DVD drive, and/or a hard disk drive (HDD). The power supply 362 provides power to the components of the cellular phone 358.

Figure 5D:
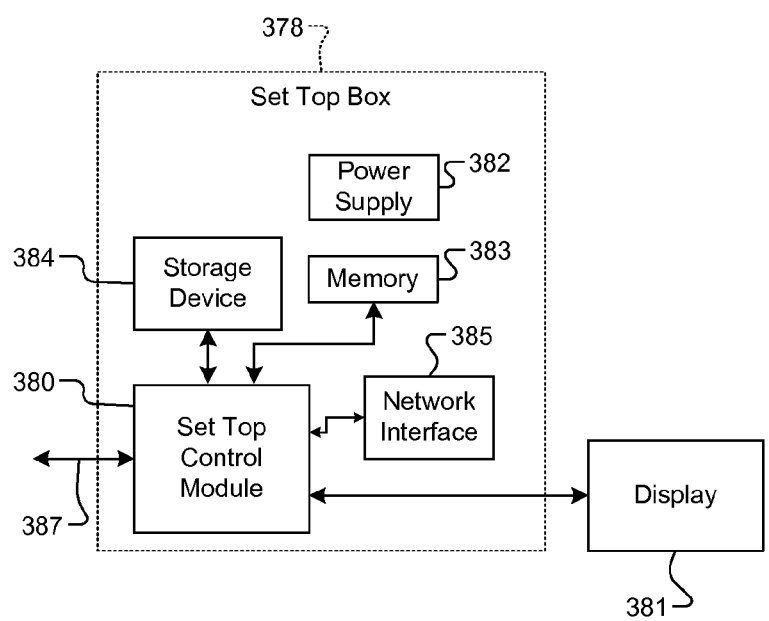
FIG. 5D is a functional block diagram of a set top box.

Referring now to FIG. 5D, the teachings of the disclosure can be implemented in a network interface 385 of a set top box 378. The set top box 378 includes a set top control module 380, a display 381, a power supply 382, memory 383, a storage device 384, and the network interface 385. If the network interface 385 includes a wireless local area network interface, an antenna (not shown) may be included.

The set top control module 380 may receive input signals from the network interface 385 and an external interface 387, which can send and receive data via cable, broadband Internet, and/or satellite. The set top control module 380 may process signals, including encoding, decoding, filtering, and/or formatting, and generate output signals. The output signals may include audio and/or video signals in standard and/or high definition formats. The output signals may be communicated to the network interface 385 and/or to the display 381. The display 381 may include a television, a projector, and/or a monitor.

The power supply 382 provides power to the components of the set top box 378. Memory 383 may include random access memory (RAM) and/or nonvolatile memory such as flash memory, phase change memory, or multi-state memory, in which each memory cell has more than two states. The storage device 384 may include an optical storage drive, such as a DVD drive, and/or a hard disk drive (HDD).

Figure 5E:
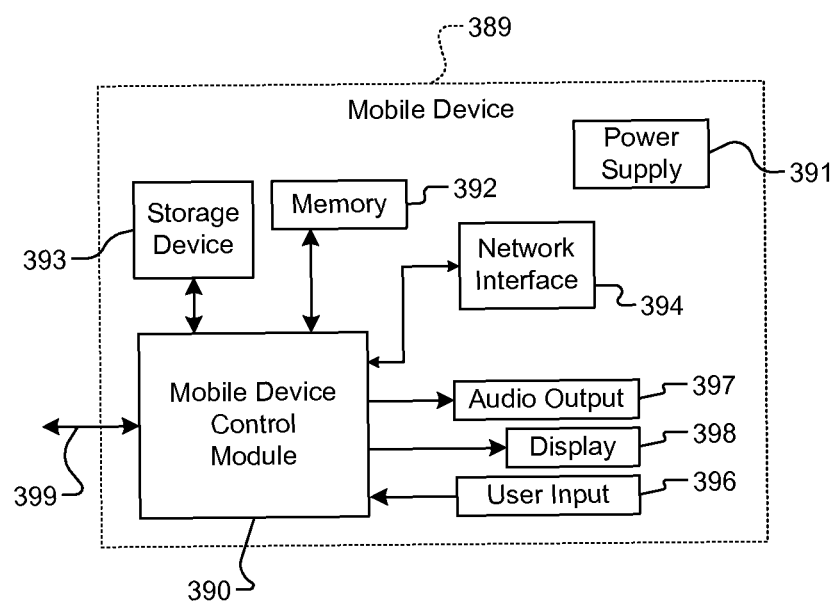
FIG. 5E is a functional block diagram of a mobile device.

Referring now to FIG. 5E, the teachings of the disclosure can be implemented in a network interface 394 of a mobile device 389. The mobile device 389 may include a mobile device control module 390, a power supply 391, memory 392, a storage device 393, the network interface 394, and an external interface 399. If the network interface 394 includes a wireless local area network interface, an antenna (not shown) may be included.

The mobile device control module 390 may receive input signals from the network interface 394 and/or the external interface 399. The external interface 399 may include USB, infrared, and/or Ethernet. The input signals may include compressed audio and/or video, and may be compliant with the MP3 format. Additionally, the mobile device control module 390 may receive input from a user input 396 such as a keypad, touchpad, or individual buttons. The mobile device control module 390 may process input signals, including encoding, decoding, filtering, and/or formatting, and generate output signals.

The mobile device control module 390 may output audio signals to an audio output 397 and video signals to a display 398. The audio output 397 may include a speaker and/or an output jack. The display 398 may present a graphical user interface, which may include menus, icons, etc. The power supply 391 provides power to the components of the mobile device 389. Memory 392 may include random access memory (RAM) and/or nonvolatile memory such as flash memory, phase change memory, or multi-state memory, in which each memory cell has more than two states. The storage device 393 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A network apparatus comprising:
   a central processing unit;
   a plurality of first physical layer devices;
   a second physical layer device; and
   a network switch comprising
      a plurality of first port modules configured to communicate with the plurality of first physical layer devices,
      a second port module configured to communicate with the second physical layer device,
      a third port module configured to communicate with the central processing unit over a first media independent interface,
      a fourth port module configured to communicate with the central processing unit over a second media independent interface,
      a switch core module configured to route data packets between connected port modules, including the first port modules and the third port module, a bypass module comprising a bypass switch configured to (i) in response to a first mode being selected, directly connect the second port module and the fourth port module, bypassing the switch core module, and (ii) in response to a second mode being selected, disconnect the second port module from the fourth port module, connect the second port module to the switch core module, and connect the fourth port module to the switch core module.

2. The network apparatus of claim 1, wherein the first mode and the second mode are mutually exclusive.

3. The network apparatus of claim 1, wherein the bypass module further comprises a multiplexer configured to, in response to the second mode being selected, connect the second port module to the switch core module, and connect the fourth port module to the switch core module.

4. The network apparatus of claim 1, wherein the fourth port module comprises a plurality of fourth port modules, and wherein the bypass module comprises a mode switch configured to connect a selected one of the fourth port modules to the bypass switch.

5. The network apparatus of claim 4, wherein each of the plurality of fourth port modules implements a respectively different communication interface.

6. The network apparatus of claim 4, wherein the mode switch determines the selected one of the fourth port modules in response to an interface control input.

7. The network apparatus of claim 6, wherein the network switch further comprises a mode register configured to store a value based on an instruction from the central processing unit.

8. The network apparatus of claim 7, wherein the network switch determines the interface control input based on the value stored in the mode register.

9. The network apparatus of claim 6, wherein the network switch determines the interface control input based on voltages applied to a plurality of mode inputs.

10. The network apparatus of claim 9, wherein the network switch determines the interface control input based on the voltages in response to powering up and in response to coming out of reset.

11. The network apparatus of claim 1, wherein the bypass switch selects the first mode or the second mode in response to a bypass control input.

12. The network apparatus of claim 11, wherein the network switch determines the bypass control input based on voltages applied to a plurality of mode inputs.

13. The network apparatus of claim 12, wherein the network switch determines the bypass control input based on the voltages in response to powering up and in response to coming out of reset.

14. The network apparatus of claim 11, wherein the network switch further comprises a mode register configured to store a value based on an instruction from the central processing unit.

15. The network apparatus of claim 14, wherein the network switch is configured to set the bypass control input based on the value stored in the mode register.

16. The network apparatus of claim 1, wherein the first media independent interface and the second media independent interface each include one of a media independent interface (MII), a reduced MII (RMII), a gigabit MII (GMII), a reduced gigabit MII (RGMII), a 10 gigabit MII (XGMII), or a serial gigabit MII (SGMII).

17. The network apparatus of claim 1, wherein the central processing unit comprises a first media access control module and a second media access control module.

18. The network apparatus of claim 1, wherein the switch core module includes an ingress processing module, a queuing module, and an egress processing module.

19. The network apparatus of claim 1, wherein the switch core module is configured to route data packets between the connected port modules based on physical layer addresses of the data packets.

20. The network apparatus of claim 19, wherein the data packets also include Internet protocol addresses, and wherein the network switch further comprises an address update module configured to update the physical layer addresses based on the internet protocol addresses.

* * * * *